United States Patent
Nilakanta et al.

(10) Patent No.: US 12,354,135 B2
(45) Date of Patent: Jul. 8, 2025

(54) PERSONALIZED RANKING OF PROMOTIONAL ITEMS

(71) Applicant: Target Brands, Inc., Minneapolis, MN (US)

(72) Inventors: Haema Nilakanta, Minneapolis, MN (US); Chad Morgan, Sunnyvale, CA (US); Luyen Le, Minneapolis, MN (US); Anick Saha, Bellevue, WA (US); Kusumakumari Vanteru, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/330,234

(22) Filed: Jun. 6, 2023

(65) Prior Publication Data

US 2024/0412252 A1 Dec. 12, 2024

(51) Int. Cl.
*G06Q 30/0251* (2023.01)

(52) U.S. Cl.
CPC ..... *G06Q 30/0255* (2013.01); *G06Q 30/0269* (2013.01)

(58) Field of Classification Search
CPC ............ G06Q 30/0255; G06Q 30/0269
USPC ............. 705/14.53; 348/5.006; 715/810
See application file for complete search history.

(56) References Cited

U.S. PATENT DOCUMENTS

| | | | |
|---|---|---|---|
| 8,046,266 B1 | 10/2011 | Geller et al. | |
| 8,972,895 B2 * | 3/2015 | Gonsalves | G06Q 30/0641 |
| | | | 715/810 |
| 9,483,789 B1 * | 11/2016 | Hanlon | G06Q 30/0631 |
| 10,303,728 B2 | 5/2019 | Kotas | |
| 10,868,888 B1 * | 12/2020 | Govan | H04L 67/63 |
| 10,902,477 B2 * | 1/2021 | Wai | G06Q 30/0207 |
| 11,416,909 B1 * | 8/2022 | Bhosle | G06Q 30/0641 |
| 2002/0032782 A1 * | 3/2002 | Rangan | G06Q 30/0277 |
| | | | 726/28 |

(Continued)

OTHER PUBLICATIONS

Sharma et al., When Hashes Met Wedges: A Distributed Algorithm for Finding High Similarity Vectors, 2017, International World Wide Web Conference Committee (Year: 2017).*

(Continued)

*Primary Examiner* — Tarek Elchanti
(74) *Attorney, Agent, or Firm* — Merchant and Gould, P.C.

(57) ABSTRACT

In general, this disclosure is directed to presenting eligible promotional items on an offer description page. In some embodiments, the eligible promotional items are personalized based on customer relevancy. One aspect is a method for dynamically presenting items eligible for a promotion on an e-commerce application of a retailer, the method comprising receiving, from a customer user computing device associated with a customer user, a request for an offer description page of the promotion, retrieving the items eligible for the promotion and user interaction data associated with the customer user, ranking the items eligible for the promotion based as least in part on the user interaction data, and generating a user interface for the offer description page presenting the items eligible for the promotion according to the ranking, wherein the offer description page initially displays a subset of the highest ranked items eligible for the promotion.

15 Claims, 14 Drawing Sheets

(56) References Cited

U.S. PATENT DOCUMENTS

| | | | |
|---|---|---|---|
| 2003/0078840 A1* | 4/2003 | Strunk | G06Q 30/0254 705/14.52 |
| 2007/0245243 A1* | 10/2007 | Lanza | H04N 7/17318 715/205 |
| 2008/0092170 A1* | 4/2008 | Shannon | H04N 21/4661 348/E5.006 |
| 2009/0163183 A1 | 6/2009 | O'Donoghue et al. | |
| 2010/0161090 A1* | 6/2010 | Smolinski | G06F 16/48 707/802 |
| 2013/0297590 A1* | 11/2013 | Zukovsky | G06F 16/951 707/722 |
| 2015/0046269 A1* | 2/2015 | Liu | G06Q 30/0241 345/204 |
| 2017/0193037 A1* | 7/2017 | Bhagwan | G06Q 30/0256 |
| 2018/0218382 A1* | 8/2018 | Ye | G06N 20/20 |
| 2019/0213167 A1* | 7/2019 | Bettencourt da Silva | G06F 40/30 |
| 2019/0340949 A1* | 11/2019 | Meisner | G09B 5/04 |
| 2020/0226632 A1 | 7/2020 | Khan et al. | |
| 2020/0250734 A1* | 8/2020 | Pande | G06N 3/045 |
| 2020/0302487 A1* | 9/2020 | Imamura | G06Q 30/0276 |
| 2020/0335096 A1* | 10/2020 | Li | G06N 3/04 |

OTHER PUBLICATIONS

Jacob, Data Intelligence and Cognitive Informatics, 2020, Proceedings of ICDICI 2020, 171-172 (Year: 2020).*

Netguru, How To Create Mobile App Interface Design, 2023 (Year: 2023).*

Personalized-Ranking Recipe (AWS/Documentation/Amazon Personalize/Developer Guide; Amazon Web Services, Inc., Dated: 2022; 6 Pages.

Amazon-personalize-samples (next_steps/core_use_cases/personalized_ranking; Dated: Last Accessed Date Jul. 12, 2022; 26 Pages.

* cited by examiner

400

$$\cos(x, y) = \frac{x \cdot y}{\|x\|_2 \|y\|_2} \text{ where } x, y \in \mathbb{R}^n$$

FIG. 4

| TCIN Pairs | Similarity* (-1 = total opposite, 1= exactly same) |
|---|---|
| <A,B> | 0.0371 |
| <A,C> | 0.1814 |
| <B,C> | 0.7237 |

700

```
┌─────────────────────────────────────────────────────────────┐
│ Retrieves pre-computed scores, associated with a guest,     │
│ for each item eligible for the promotion                    │
│                          704                                │
└─────────────────────────────────────────────────────────────┘
                              │
                              ▼
┌─────────────────────────────────────────────────────────────┐
│ Determine real-time score for the guest based at least in   │
│ part on guest interaction data                              │
│                          706                                │
└─────────────────────────────────────────────────────────────┘
                              │
                              ▼
┌─────────────────────────────────────────────────────────────┐
│         Calculate an overall score for each of the          │
│                      eligible items                         │
│                          708                                │
└─────────────────────────────────────────────────────────────┘
                              │
                              ▼
┌─────────────────────────────────────────────────────────────┐
│              Rank the eligible items by overall score       │
│                          710                                │
└─────────────────────────────────────────────────────────────┘
```

$$Pr(y_{ij}) = g(\beta_0 + \beta_1 salesprice_j + \beta_2 salesrank_j +$$
$$\beta_3 viewrecency_{ij} + \beta_4 a2crecency_{ij} + \beta_5 salesrecency_{ij} +$$
$$\beta_6 I(viewrecency_{ij} > 0) + \beta_7 I(a2crecency_{ij} > 0) + \beta_8 I(salesrecency_{ij} > 0))$$

PERSONALIZED RANKING OF PROMOTIONAL ITEMS

BACKGROUND

Retailers frequently offer promotions for items sold by the retailer in order to increase sales and ultimately revenue. In some examples, retailers present theses offers as part of an electronic commerce (e-commerce) experience and/or advertisement. The promotion may include an offer description page which provides information about the promotion. In some embodiments, an item associated with the promotion is presented on the offer description page. Similarly, an offer description may be displayed alongside an eligible item. In some embodiments, a set of promotional items are presented alongside an offer description. In some examples, the promotional items presented alongside the offer description are ordered and presented based on a gross number of sales.

SUMMARY

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

In general, this disclosure is directed to presenting eligible promotional items on an offer description page. In some embodiments, the eligible promotional items are personalized based on customer relevancy.

One aspect is a method for dynamically presenting items eligible for a promotion on an e-commerce application of a retailer, the method comprising receiving, from a customer user computing device associated with a customer user, a request for an offer description page of the promotion, retrieving the items eligible for the promotion and user interaction data associated with the customer user, ranking the items eligible for the promotion based as least in part on the user interaction data, and generating a user interface for the offer description page presenting the items eligible for the promotion according to the ranking, wherein the offer description page initially displays a subset of the highest ranked items eligible for the promotion.

Another aspect is an e-commerce system comprising at least one processor, at least one memory storing instructions, which when executed by the at least one processor cause the e-commerce system to receive, from a computing device associated with a customer user, a request for an offer description page of the promotion, retrieve the items eligible for the promotion and interaction data associated with the customer user, rank the items eligible for the promotion based as least in part on the interaction data, and generate a user interface for the offer description page presenting the items eligible for the promotion according to the ranking, wherein the offer description page initially displays a subset of the highest ranked items eligible for the promotion.

Yet another aspect is a user interface presenting a promotion on an e-commerce application for a retailer, the user interface comprising an offer description page with a list of items eligible for the promotion, wherein to determine which of a plurality of eligible items to display in the list of items eligible for the promotion includes to retrieve the plurality of eligible items and interaction data associated with a customer user accessing the offer description page, ranking the items eligible for the promotion based as least in part on the interaction data, and wherein the list of items eligible for the promotion initially includes a subset of highest ranked items of the plurality of eligible items.

BRIEF DESCRIPTION OF THE DRAWINGS

The accompanying drawings, which are incorporated in and constitute a part of the description, illustrate several aspects of the present disclosure. A brief description of the drawings is as follows:

FIG. 4 illustrates an equation for calculating the pairwise cosine similarity.

FIG. 7 illustrates an example method for ranking items eligible for a promotion.

DETAILED DESCRIPTION

Figure 1:
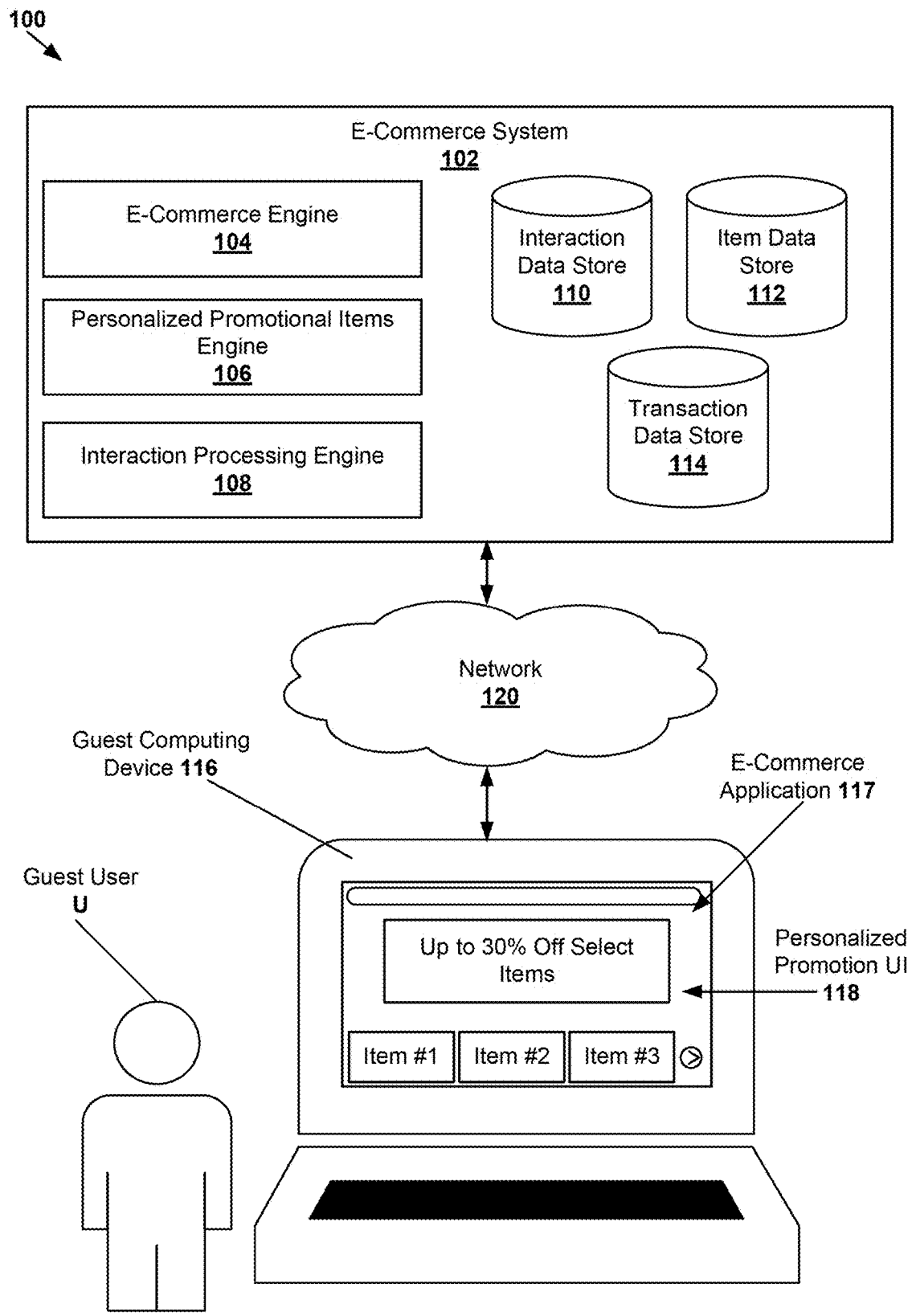
FIG. 1 illustrates an example environment for providing a personalized promotion user interface.

Reference will now be made in detail to exemplary aspects of the present disclosure that are illustrated in the accompanying drawings. Wherever possible, the same reference numbers will be used throughout the drawings to refer to the same or like parts.

In general, this disclosure is directed to presenting eligible promotional items on an offer description page. In some embodiments, the eligible promotional items are personalized based on relevancy to a particular customer user.

In some examples, eligible promotional items are presented on an offer description page to customer users of a retailer. The offer description page is presented as part of an e-commerce web application. In some embodiments, the items are ordered based on customer user relevancy. In some examples, this includes personalizing the offers presented to a customer user to ensure that the customer user receiving the offer sees items that are most relevant to that customer user.

In some embodiments, the promotional items are ordered based on similarity to historical interactions between the customer user and various items sold by the retailer. Item embeddings are generated and used to compare past interactions between the customer user and various items to the listing of items eligible for a particular promotion, where eligible items that ranked as similar to the items the customer user has interacted with are presented to the customer user first. In some examples, a model is used to generate embeddings for a given item. For example a "word2vec" model can be used to learn associations between items sold by the retailer. For example, items that are typically purchased together are learned to be more similar than items not typically purchased together (e.g., peanut butter and jelly, as compared to two different brands of peanut butter). In some embodiments, a cosine, pairwise similarity is computed between items in the user history that have computed embeddings and items eligible for the promotion that have computed embeddings.

In some embodiments, a statistical model is built to score items for a customer user in real-time. In some examples, store and digital sales data are analyzed to determine sales per category. A model is trained based on some extracted features to generate model coefficients. The extracted features and model coefficients are used to pre-compute model features. At the time an offer is presented, a set period of time (e.g., 100 days) item history for the user, as well as "add to cart" and sales recency data, are used in combination with an item catalog and the pre-computed model features to generate scores for each of the eligible offer items. Such items can be sorted by score and presented to a user.

In some embodiments, a user's interaction with an e-commerce application are processed to reorder the promotional items based on these interactions. For example, if a user selects a promotional item for the cart, the "add to cart" action is processed causing a recorder of the promotional items. For example, the item added to the cart may be boosted among the promotion items for the user. In some embodiments, the interaction data is weighted based on the recency of the interaction.

In some embodiments, the model architecture for promotional items disclosed herein uses pre-computation of certain model features. The pre-computation of model features allows for faster service of relevant search results, because at the time a customer is shopping within the e-commerce application (e.g., a mobile application or on a website), a set of model coefficients and pre-computed model features may be combined and applied to the currently active promotional items to generate weighted sum scores that may then be sorted and a subset displayed.

FIG. 1 illustrates an example environment 100 for providing a personalized promotion user interface 118. The environment 100 includes an e-commerce system 102 in communication with a customer user computing device 116 via a network 120. Also shown is a customer user U.

The e-commerce system 102 includes an e-commerce engine 104, a personalized promotional items engine 106, an interaction processing engine 108, an interaction data store 110, an item data store 112, and transaction data store 114. In some embodiments, the e-commerce system 102 comprises one or more servers.

The e-commerce system 102 may include one or more webservers which is accessible by a plurality of computing devices including the customer user computing device 116. The webserver may provide website component files and back end services which are provided to computing devices in response to a request. In some embodiments, the one or more webservers provide back-end services for an application running on the customer user computing device 116. In some embodiments, the e-commerce system is associated with an e-commerce retailer, e-commerce platform, and/or one or more physical retail stores.

In some embodiments, the e-commerce system 102 includes an e-commerce engine 104. The e-commerce engine 104 operates to manage e-commerce operations for the retailer. For example, the e-commerce engine can perform the logic for searching items, performing checkout processes, initiating delivery procedures, services for the e-commerce application 117, etc.

The personalized promotional items engine 106 determines a personalized order to present items eligible for a given promotion. The personalized promotional items engine 106 determines how to display eligible items to the customer user U. In some embodiments, the eligible items are ranked based on which items are most likely to be relevant to a user. For example, the items may be ranked based on a predicted likelihood a customer user will purchase the item. Example methods for ranking items eligible for a promotion are illustrated and described in FIGS. 3 and 7. In some embodiments, the ranking of items is based at least in part on customer user interaction data.

In some embodiments, the personalized promotional items engine 106 publishes an API which allows various computing systems to interact with the personalized promotional items engine 106 to perform the processes disclosed herein. For example, an e-commerce system 102 may call the API to generate a personalized ranking of items eligible for a promotion for the user U in response to the user U selecting an offer on the e-commerce application 117.

In some embodiments, the personalized promotional items engine 106 ranks items eligible for an offer based item similarity. In one example method, the personalized promotional items engine capture embeddings for items eligible for the promotion using transaction data from the transaction data store 114, retrieves interaction data including items interacted with by the customer user, and calculates similarity scores, calculating a similarity score between the items interacted with by the customer user and the items eligible for the promotion and ranks the items from highest similarity to lowest similarity. In some embodiments, the similarity scores are calculated using a pairwise cosine similarity equation, such as the equation 400 illustrated in FIG. 4. In some embodiments, the personalized promotional items engine 106 receives an items embedding table for a plurality of items, customer interaction data including item identifiers for items interacted with by the customer user, and item identifiers for the items eligible for the promotion, where the item embeddings table includes entries corresponding to at least the item identifiers for the items interacted with by the customer user, and the item identifiers for the items eligible for the promotion. In some examples, the items interacted with by the customer user include items interacted with the customer user over a predetermined time period (e.g., over the previous week). In some example embodiments, customer user interactions are used to weight the similarity scores. For example, a high weight will be applied to an item the customer user has recently interacted with.

In some embodiments, the personalized promotional items engine 106 uses a model to rank the items eligible for the promotion. In some examples, the model is trained on customer user features to determine relevant items for the customer user (e.g., items the customer user is most likely to purchase). In example embodiments, some of the features are pre-computed and some features are computed in real-time or near real-time as the customer user user U interacts with the e-commerce application 117. In some examples, inputs to the model include interaction data and item data, and sales data. In some embodiments, the inputs to the model also include the pre-computed features for the customer user U.

The interaction processing engine 108 operates to process a customer user's interactions with an e-commerce application. For example, the interaction processing engine 108 may log: items (or types of items) a user has recently viewed on an e-commerce application, items the user has added to a shopping cart, items recently purchased by the user. In some embodiments, the interaction data includes transactions at a physical retail store and/or transactions made using an e-commerce application. In some embodiments, the retailer may capture the transaction data at a physical retail store using a loyalty program (e.g., by requesting a user provide an ID when checking out at a physical retail store where the ID is associated with an account for shopping on the e-commerce application 117. The loyalty program may offer certain benefits and/or reward to encourage participation by customer users. In some embodiments, the customer user's ID may be linked with a payment method. The processed interactions are stored at the interaction data store 110.

As shown in FIG. 1, the e-commerce system 102 includes an interaction data store 110, an item data store 112, and a transaction data store 114. In some embodiments, these data stores are included within a single database system (e.g., a relational database system). In other embodiments, each data store includes its own database system.

The interaction data store 110 stores interaction data for a plurality of customer users of the retailer. In some embodiments, interaction data is stored for a predetermined period of time. For example, interaction data for the previous 100 days. In some examples, the interaction data is organized by item type (e.g., grocery, kitchen, electronics, etc.) for the items associated with the interaction. In some embodiments, the interaction data store 110 is updated in real-time or in near-real-time. For example, the interaction data store 110 may be updated as the customer user U interacts with the e-commerce application 117. In some embodiments, interactions include page views, items added to carts, etc.

The item data store 112 stores items sold by the retailer. In some embodiments, the item data store 112 includes item descriptions, price, dimensions features, and/or item metadata. In some embodiments, the items are organized by department. In some embodiments a subset of items are associated with a promotion. For example, a promotion may apply to items in a specific department.

The transaction data store 114 stores historical transactions for a plurality of customers of the retailer associated with the e-commerce system. In some embodiments, the transactions include transactions made online as well as at physical stores. The transaction data may be organized by customer user which the transaction is associated with. In some embodiments, the transaction data store 114 is updated in real-time or in near real-time. For example, as customer users complete purchases. In some embodiments, the transaction data is processed to generate item embeddings and/or to determine customer user descriptive features.

The customer user computing device 116 operates an e-commerce application 117. The e-commerce application is configured to operate on a user device. In some embodiments, the e-commerce application 117 generates a user interface which allows a user to browse, select, and purchase goods or services online. This e-commerce application include various components to present products, search for items, review item details, create a shopping cart, perform checkout procedures, and manage an e-commerce account.

The e-commerce application 117 is configured to interface with the e-commerce system 102 to provide various combinations of these components.

In the embodiment shown in FIG. 1, the e-commerce application 117 presents the personalized promotion user interface 118. The customer user computing device 116 can be a personal computing device such as a laptop, smart phone, tablet, etc. In example embodiments, the customer user computing device 116 includes a display which presents the personalized promotion user interface 118. An example of further components included in a computing device are illustrated and described in reference to FIG. 13.

The personalized promotion user interface 118 presents a promotion to the user U. The personalized promotion user interface 118 presents an offer description and a set of items eligible for the promotion. In some embodiments, it is advantageous to present a subset of only the most relevant items for the user U. For example, given the limited space on the customer user computing device 116 display a subset of items to the user. In some embodiments, the customer user computing device 116 is a device with a limited size screen (e.g., a smart phone) and presenting a personalized ordering of items eligible for a promotion improves the customer experience, allowing the customer user to quickly identify a relevant product without need to scroll through a long list of products which may not be relevant to the customer user. An example personalized promotion user interface 118 is illustrated and described in reference to FIG. 12.

The network 120 allows for communication between the customer user computing device 116 and the e-commerce system 102. In some embodiments, the network 120 is a public network such as the Internet.

Figure 2:
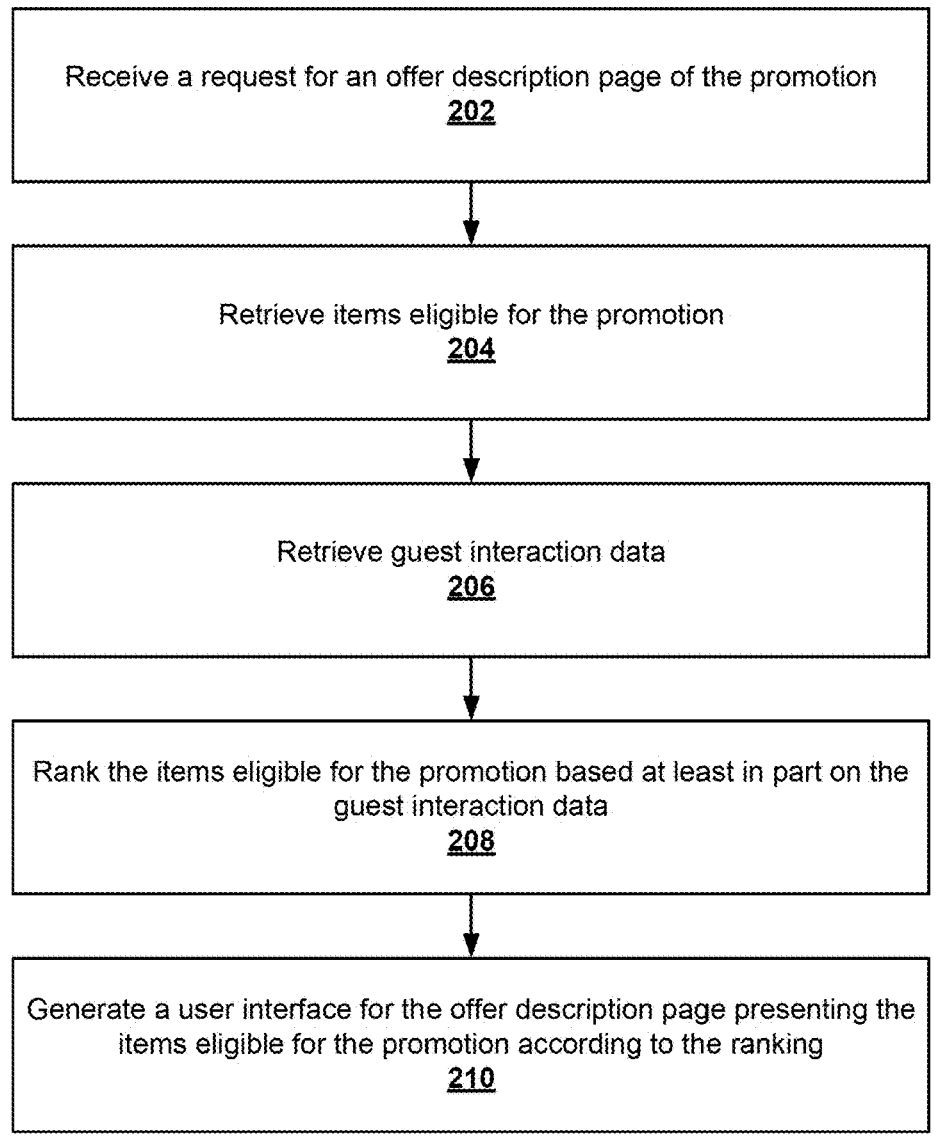
FIG. 2 illustrates an example method for generating personalized promotion user interface.

FIG. 2 illustrates an example method 200 for generating personalized promotion user interface. In some embodiments, the method 200 is performed at the e-commerce system 102 illustrated and described in reference to FIG. 1. The method 200 includes the operations 202, 204, 206, 208, and 210.

The operation 202 receives a request for an offer description page of the promotion. In some embodiments, the request is sent from a computing device associated with a customer user. In some examples, the request is sent from an application (e.g., mobile application or web application) that the customer user is logged into with a user account. In some embodiments, the customer user selects an offer to view the offer description page. In some embodiments, an event triggers the sending of the request for the offer description page. For example, when a user selects a department with an ongoing promotion the e-commerce system will provide the offer description page to the customer user.

The operation 204 retrieves items eligible for the promotion. In some embodiments, the promotion may apply to all items sold by the retailer. In some embodiments, the promotion applies to a subset of items sold by the retailer. For example, the promotion may apply to a department (e.g., electronics) or a type of item (e.g., fruits). In some embodiments, the operation 204 retrieves the most relevant items eligible for the promotion. In some embodiments, the most relevant items are identified based on the number sales for the items. For example, a predetermined number of items may be retrieved based on the items having the most sales of the items eligible for the promotion (e.g., the 100 items with the most sales over the last week). In some embodiments, a service determines which items are eligible for the promotion.

The operation 206 retrieves interaction data. In some embodiments, at least some of the interaction data is retrieved in real-time. For example, the real-time interaction data can include the interactions the customer user makes with the e-commerce application. The interaction data can include online interactions (e.g., which are logged as the user interacts with the e-commerce application and/or can be derived from transaction data from physical retail stores (e.g., tracking that the user bought a certain set of items at a time of a transaction).

The operation 208 ranks the items eligible for the promotion based at least in part on the interaction data. In some embodiments, each of the eligible items are scored based on similarity with items previously interacted with by the customer user. Examples, of items previously interacted with by the customer user include: items previously purchased by the customer user, items previously viewed by the customer user (e.g., as logged by an e-commerce application), items added to a cart of the customer user, etc. In some embodiments, a model is used to predict relevant items based on customer user and item features. For example, a model may predict a likelihood a customer user will purchase an item then rank, once the model has predicted a likelihood for each of a plurality of items, the plurality of items are ranked based on these predictions. Example methods for ranking the items eligible for the promotion are illustrated and described in reference to FIGS. 3 and 8.

The operation 210 generates a user interface for the offer description page presenting the items eligible for the promotion according to relevancy to the particular customer user. In some embodiments, the user interface is optimized for the screen size of the customer user computing device. For example, one user interface may be used on a smart phone, another on a tablet, and yet another on a laptop/desktop computer. In some embodiments, some or all of these user interfaces include limited space such that only a subset of the highest ranked items can be initially displayed to a customer user. In some embodiments, the user interface includes an element to scroll the list of items eligible for the promotion according to the ranking.

Figure 3:
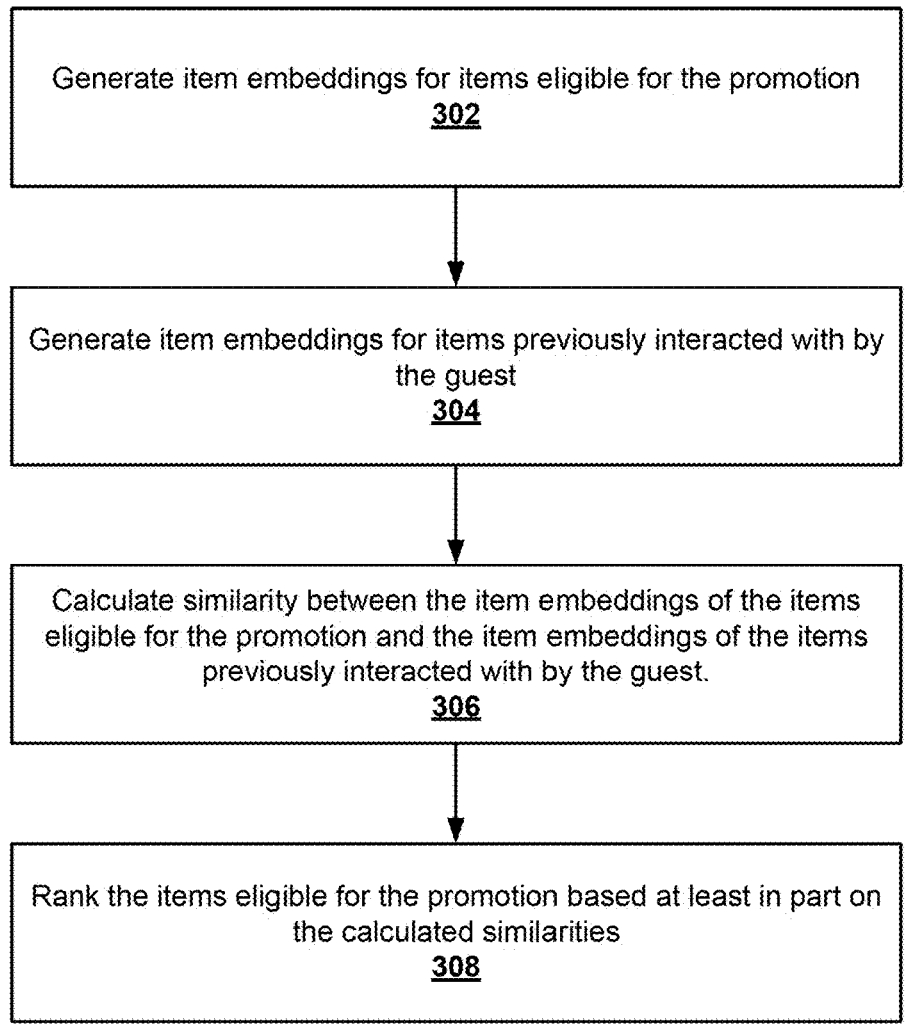
FIG. 3 illustrates an example method for ranking items eligible for a promotion.

FIG. 3 illustrates an example method 300 for ranking items eligible for a promotion. In some embodiments, the method 300 is performed at the e-commerce system 102 illustrated and described in reference to FIG. 3. In some embodiments, the method 300 is performed as part of the operation 208 illustrated and described in reference to FIG. 1. The method 300 includes the operations 302, 304, 306, and 308.

The operation 302 generates item embeddings items eligible for the promotion and the operation 304 generates item embeddings for items previously interacted with by the customer user. In some example embodiments, the item embeddings include a numerical vector representations of non-numerical object. For example, numerical vector representations for text, image, products, etc. can be used. In some embodiments, a model is used to construct the vector representations. In some examples, the vectors are constructed used transaction data. For example, a model may construct a vector representation for an item by determining which other items are typical purchased alongside the item. In some embodiments, a "word2vec" model is used to generate the vector representations. The "word2vec" model includes a neural network model to learn associations between words (e.g., words related to items). In some embodiments, the model for constructing embeddings is trained using a skip-gram technique to predict context for a given target word. Other unsupervised learning techniques and/or supervised learning techniques can also be used.

In some embodiments, the item embeddings for items eligible for a promotion are organized with a data structure. The data structure may include an offer ID with an array of item IDs corresponding to items that are eligible for the promotion. In some embodiments, the data structure includes a field defining a maximum number of items to retrieve for an offer. For example, the maximum number of items may be set to 100 and the item IDs for the 100 top selling eligible items are included in the array of item IDs. In some examples, the data structure is defined in a standard format, such as a JSON format.

In some embodiments, the item embeddings for the items pervious interacted with by the customer user are organized in a data structure. The data structure may include an item ID of an item previously interacted with by the user and an array of transaction data related to the item. In some embodiments, the transaction data is retrieved from a transaction embedding table. In some examples, the data structure is defined in a standard format, such as a JSON format.

In some embodiments, the item embeddings are processed to generate vector representations of the item embeddings. For example, the item embedding data can be processed with a "word2vec" model to generate vector representation of the item embeddings. An example method for generating the vector representations is illustrated and described in reference to FIG. 14.

The operation 306 calculates similarity between the item embeddings of the items eligible for the promotion and the item embeddings of the items previously interacted with by the customer user. In some embodiments, the operation 306 calculates a pairwise cosine similarity between the item embeddings of the items eligible for the promotion with the item embeddings of the items previously interacted with by the customer user. An example equation 400 for calculating the pairwise cosine similarity is illustrated and described in reference to FIG. 4.

The operation 308 ranks the items eligible for the promotion based at least in part on the calculated similarities. In some embodiments, the items eligible for the promotion are ranked based on the similarity score calculated at the operation 306. In some example embodiments, the similarity scores are weighed by number of total sales for each item over a predetermined time period and then ranked.

FIG. 4 illustrates an example equation 400 for calculating the pairwise cosine similarity. In some embodiments, a first vector comprising the embeddings of the item eligible for the promotion "x" and embeddings for an item previously interacted with by the customer user are generated "y". A dot product for these vectors is determined, which is divided by a cross product of the vectors. Using the equation 400 items are pairwise scored by similarity. These similarity scores are then ranked to determine which items are most likely to be relevant to a customer user. In some embodiments, the similarity scores are weighed by recent customer interactions prior to ranking the items.

Figure 5:
FIG. 5 illustrates an example output of pairwise similarity scores.

FIG. 5 illustrates an example output 500 of pairwise similarity scores, in accordance with some embodiments of the present disclosure. In some embodiments, the output 500 is determined using the equation 400 illustrated and described in reference to FIG. 4 where the predicted similarity score is between −1 for not similar and 1 for similar.

Figure 6:
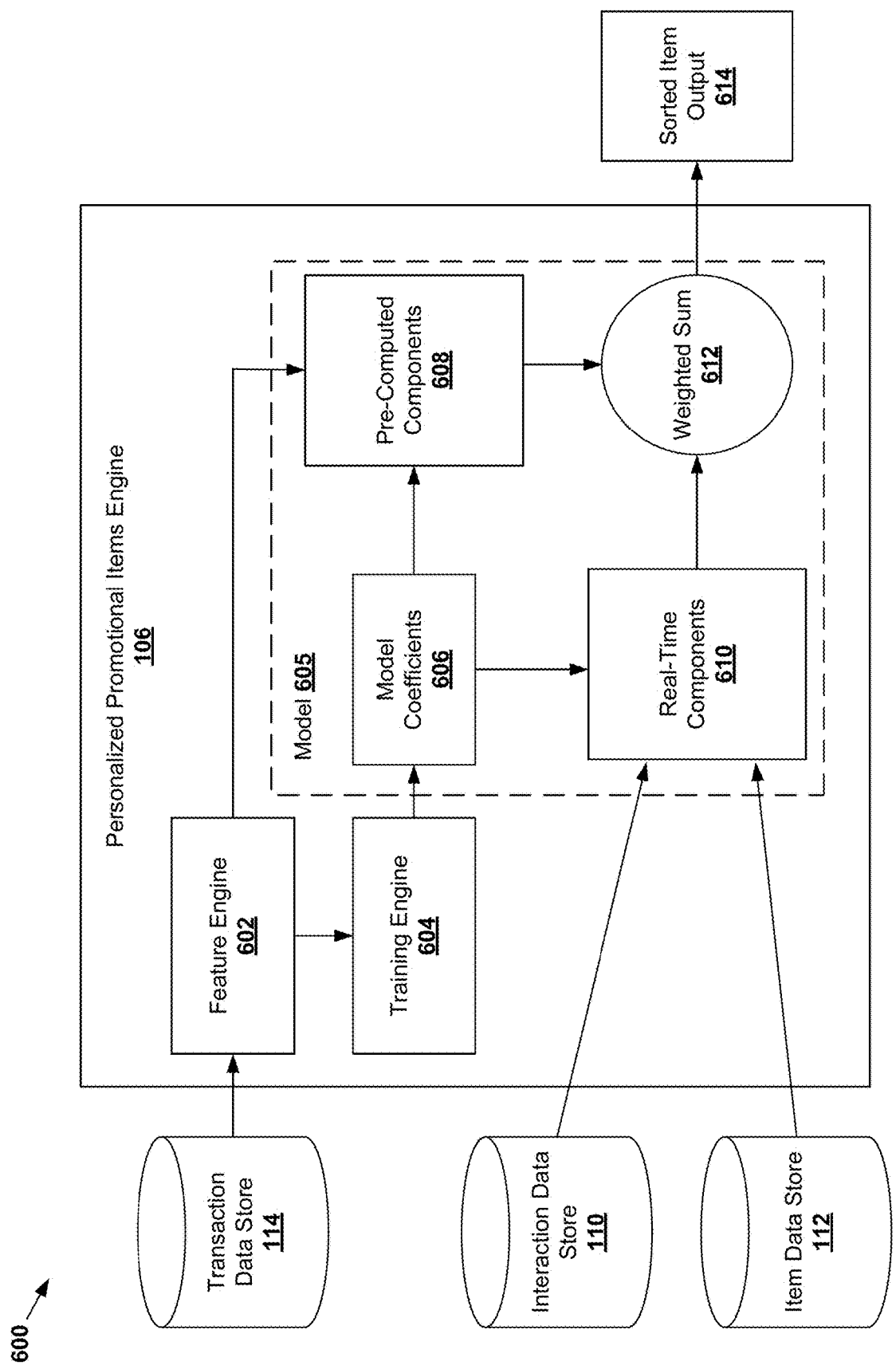
FIG. 6 is an example system flow diagram illustrating a process for ranking items eligible for a promotion.

FIG. 6 is an example system flow diagram illustrating a process 600 for ranking items eligible for a promotion. In some embodiments, the process 600 is executed at the e-commerce system 102 illustrated and described in reference to FIG. 1. In some embodiments, the process 600 is performed as part of the operation 208 illustrated and described in reference to FIG. 2.

The feature engine 602 processes transaction data from the transaction data store 114. In some embodiments, the feature engine 602 retrieves transaction data for a particular customer and/or transaction data for one or more items. The feature engine 602 process the transaction data and provides training data to the training engine 604. For example, the feature engine may process the transaction data to determine a number of customer user sales in a particular category. The transaction data stored at the transaction data store 114 can include in-store sales data and online sales data.

The training engine 604 trains the model 605 to predict a likelihood that the particular customer will purchase an item eligible for a promotion. The training engine 604 trains a model 605 to processes transaction to predict customer user features. In some embodiments, the training engine 604 also uses interaction data and/or item data to train the model 605. In some embodiments, the training engine 604 also trains the model 605 to detect item features. These features are used to predict a likelihood a customer user will purchase the item. In some embodiments, the model 605 outputs a relevancy score. In some examples, the relevance score corresponds to a likelihood the customer user will purchase the item. An example method for training the model is illustrated and described in reference to FIG. 8.

In some embodiments, the model is a statistical model which is bult to score items for a customer in real-time. In the example shown, the model 605 includes model coefficients 606 which are trained (e.g., weighed) by the training engine 604. In some embodiments, the model coefficients 606 include pre-computed components 608 and real-time components 610.

In the example shown, the pre-computed components 608 are trained using the extracted features output from the feature engine 602. In some of these embodiments, the feature engine 602 provides transaction data from the transaction data store 114 for a particular customer user which provide the model 605 insights into which type of items may be relevant to the customer user. In some embodiments, the transaction data for a customer user is processed by the model 605 with the pre-computed components 608 and the scores are stored in a database accessible by the personalized promotional items engine 106. In some embodiments, these scores may be updated periodically by processing any additional transaction data for the customer user (e.g., daily, weekly, monthly, etc.).

One advantage of using the pre-computation of the pre-computed components 608 includes faster service of relevant search results, because at the time a customer is shopping within the e-commerce application, a set of model coefficients and precomputed model features may be combined and applied to the currently active promotional items to generate weighted sum scores that may then be sorted and a subset displayed.

In some alternative embodiments, the model does not include the pre-computed components 608 and the real-time components 610 are used to score the items eligible for the promotion. For example, the model may include the equation 1000 illustrated and described in reference to FIG. 10.

In the example shown, the real-time components 610 are trained using data from the interaction data store and the item data store. In some embodiments, the real-time components 610 are configured to consider recent digital activity. For example, the real-time components use information from the customer user's current online shopping session to further refine the predictions. The real-time components 610 may also account for real-time item data (e.g., updated pricing, current inventory, etc.). The model predicts a likelihood a customer user will purchase an item based on a weighted sum 612 of the pre-computed components 608 and the real-time components 610. Once score the items are ranked and sorted.

In some embodiments, the personalized promotional items engine 106 retrieves the items that are eligible for a promotion from the item data store 112 and recent customer user interactions from the interaction data store as inputs to the model 605. The real-time components 610 process these inputs to predict a likelihood of purchase score for each item associated with the particular customer user. In some embodiments, a predetermined number of the top selling items eligible for the promotion are scored. For example, the top 100 items based on sales volume over the previous week may be scored. In some embodiments, the interaction data includes interactions occurred over a predetermined time period. E.g., the interaction data from the previous 100 days and including interaction data captured in real time (e.g., as the customer user interacts with the e-commerce application).

In the example shown, the personalized promotional items engine 106 outputs a sorted item output 614. The sorted item output is based on the weighted sum 612 scores for each item that is eligible for the promotion, or in some embodiments, a subset of items that are eligible for the promotion which meet a certain sales volume criteria or threshold.

FIG. 7 illustrates an example method 700 for ranking items eligible for a promotion. In some embodiments, the method 700 is executed at the e-commerce system 102 illustrated and described in reference to FIG. 1. In some embodiments, the method 700 is performed as part of the operation 208 illustrated and described in reference to FIG. 2. The method 700 includes operations 702, 704, 706, 708, and 710.

The operation 702 retrieves pre-computed scores, associated with a customer user, for each item eligible for the promotion. In some embodiments, the precomputed scores a retrieved from a look-up table using a user ID associated with the customer user.

The operation 704 determines real-time scores for the customer user based at least in part on interaction data. For example, the inputs provide by the customer user interacting with the e-commerce application are captured and processed to determine a probability the customer user will purchase for each the items eligible for the promotion. In one non limiting example, the interaction data may include an event that a user has added an item which is eligible for a promotion to a cart, which may boost the real-time score of the item from among the promotional items.

The operation 708 calculates an overall score for each of the eligible items item. In some embodiments, a weighted sum of the pre-computed scores and the real-time scores is generated for each of the items eligible for the promotion.

The operation 710 ranks the eligible items by overall score. The operation 710 ranks the items from the most likely to be purchased by the customer user to the least likely to be purchased by the customer user. The ranking is used to generate a user interface which initially displays a subset of the most likely to be purchased items from the items eligible for the promotion.

Figure 8:
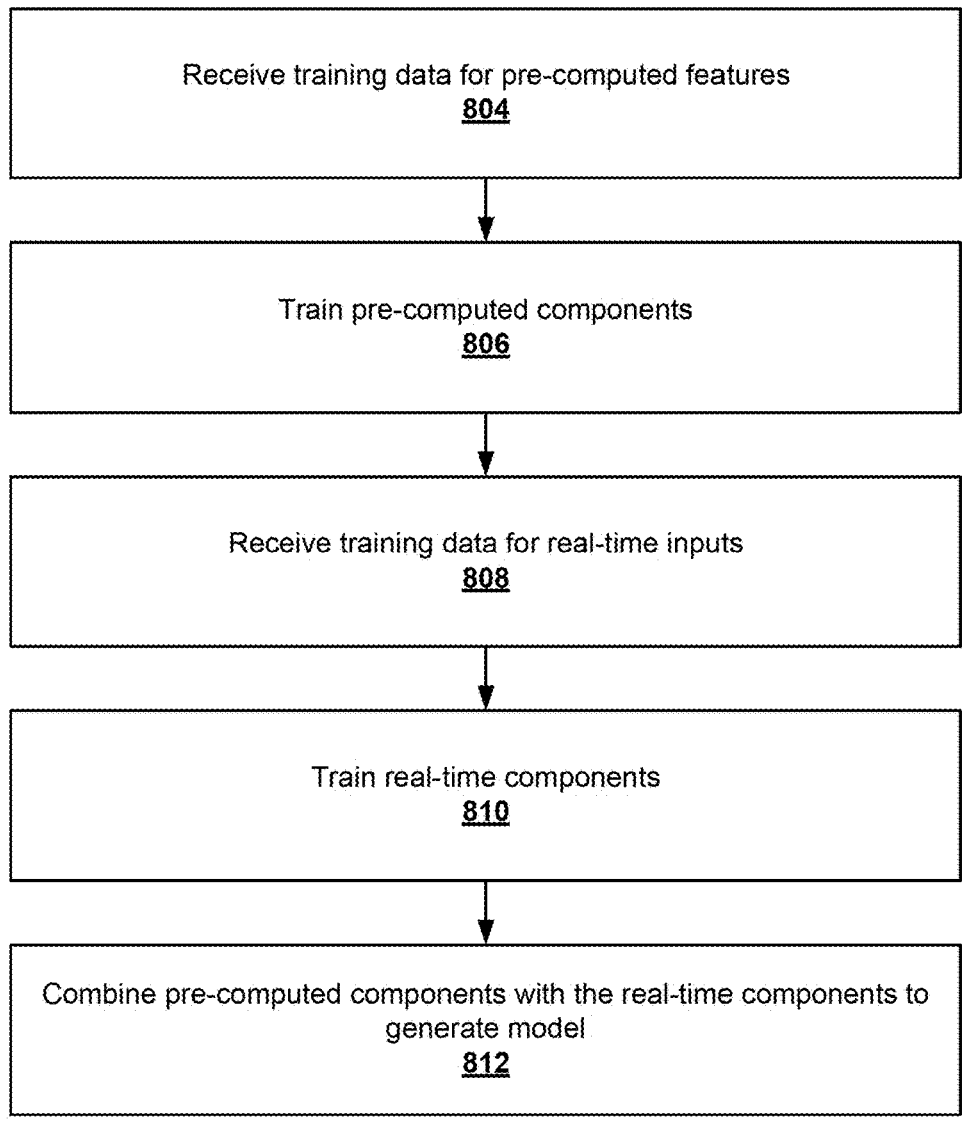
FIG. 8 illustrates an example method for training a model to predict personalized scores for items eligible for a promotion.

FIG. 8 illustrates an example method 800 for training a model to predict personalized scores for items eligible for a promotion. The method 800 includes the operations 804, 806, 808, 810, 812. In some embodiments, one of more of these operations are optional and/or may be performed in different orders.

The operation 804 receives training data for the pre-computed features. In some embodiments, the training data is retrieved from a transaction dataset associated with a customer user. In some embodiments, the training data includes historical interaction data for the customer user, and item data for a plurality of items sold by the retailer. In some embodiments, the training data is compiled from several different data sources. In some embodiments, the transaction data is limited to transactions which occurred over a predetermined period of time (e.g., the previous 100 days).

The operation 806 trains the pre-computed components using the training data for the pre-computed features. For example, the transaction data for a customer user can be processed to determine which features make items relevant to the specific customer user. In some embodiments, the pre-computed components are trained using features extracted from the transaction data.

As discussed above, in some embodiments, the pre-computed components are trained using transaction data. For example real-time logistic regression models may be trained using transaction data to determine whether the customer user has previously purchased an item or not based on customer behavior, such as number of trips recency of purchases, category of the item, number of sales for the item, etc.

The operation 808 receives training data for real-time inputs. In some embodiments, the training data for real-time inputs include interaction data. In some embodiments, the training data for real-time inputs includes item data. In some embodiments, the training data is compiled from several different data sources.

The operation 810 trains real-time components using the real-time inputs. In some embodiments, the real time components are trained using transaction data. In some embodiments, the real-time components are trained on the fly as the user interacts with the e-commerce application. In some of these embodiments, specific user interactions will be labeled as positive or negative events. For example, a user adding an item to a shopping cart is labeled as a positive event indicating that is the type of item the user is interested in. A user browsing a catalog of items but not selecting to view an item may be labeled as a negative training event. The real-time components capture and process these types of interactions to further refine the predicted likelihood of purchase.

The operation 812 combines pre-computed components with the real-time components to generate the model. In some embodiments, the model calculates a weighted sum of the pre-computed components and the real-time components.

Figure 9:
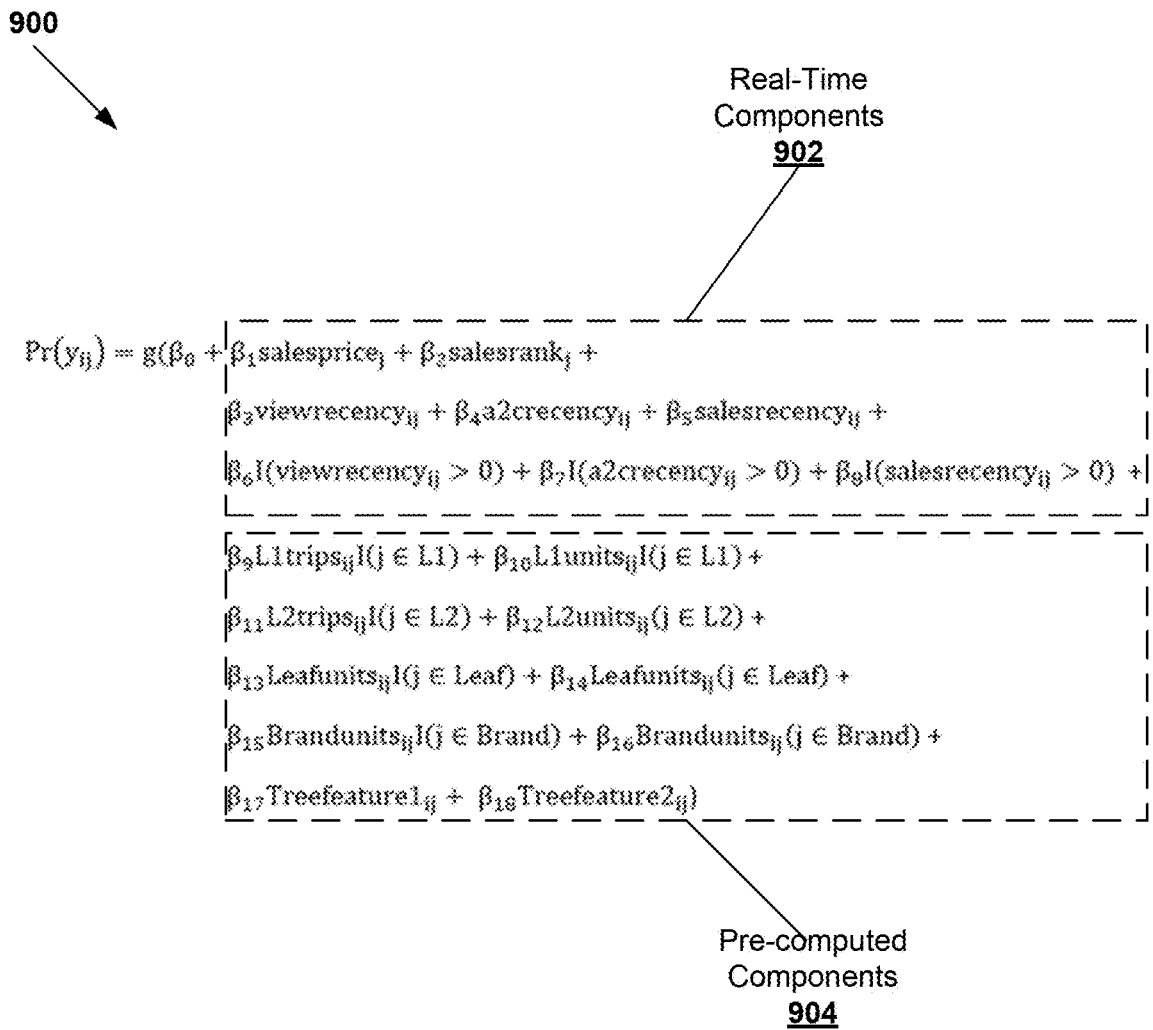
FIG. 9 illustrates an equation for a model used to predict personalized scores for items eligible for a promotion.

FIG. 9 illustrates an equation 900 for a model used to predict personalized scores for items eligible for a promotion. The equation 900 predicts a likelihood that a customer user will make a purchase of an offer. In some embodiments, the equation predicts a probability that customer user "i" will purchase item j. The equation 900 includes the real-time components 902 and pre-computed components 904.

The real-time components 902 includes features which are determined while a customer is in a current e-commerce shopping experience. For example, the real-time components can include interactions captured while the customer user is shopping on an e-commerce website using a browser or on an e-commerce application. In some embodiments, the real-time components 902 include sales price of the item, sales rank of the item (e.g., number of units sold over a set time period), and interaction data for the customer user (including pages viewed, offers viewed, items, viewed, items added to a cart, items purchased, etc.).

The pre-computed components 904 includes features that are captured prior to the current session by the customer user. In some embodiments, the predicted value for the pre-computed components 904 is retrieved from a look-up table using a customer user ID. In some examples, the pre-computed components 904 consider the impact of features of the offer, the item, and the customer. In some embodiments, the pre-computed components 904 considers the impact of previous shopping trips by the customer user. These trips can include online purchases and/or purchases made at a physical retail store.

Figure 10:
FIG. 10 illustrates another equation for a model used to predict personalized scores for items eligible for a promotion.

FIG. 10 illustrates another equation 1000 for a model used to predict personalized scores for items eligible for a promotion. The equation 1000 predicts a likelihood that a user will make a purchase of an offer. The equation 1000 predicts a likelihood that user "i" will purchase item "j" considering real-time components without using pre-computed components.

Figure 11:
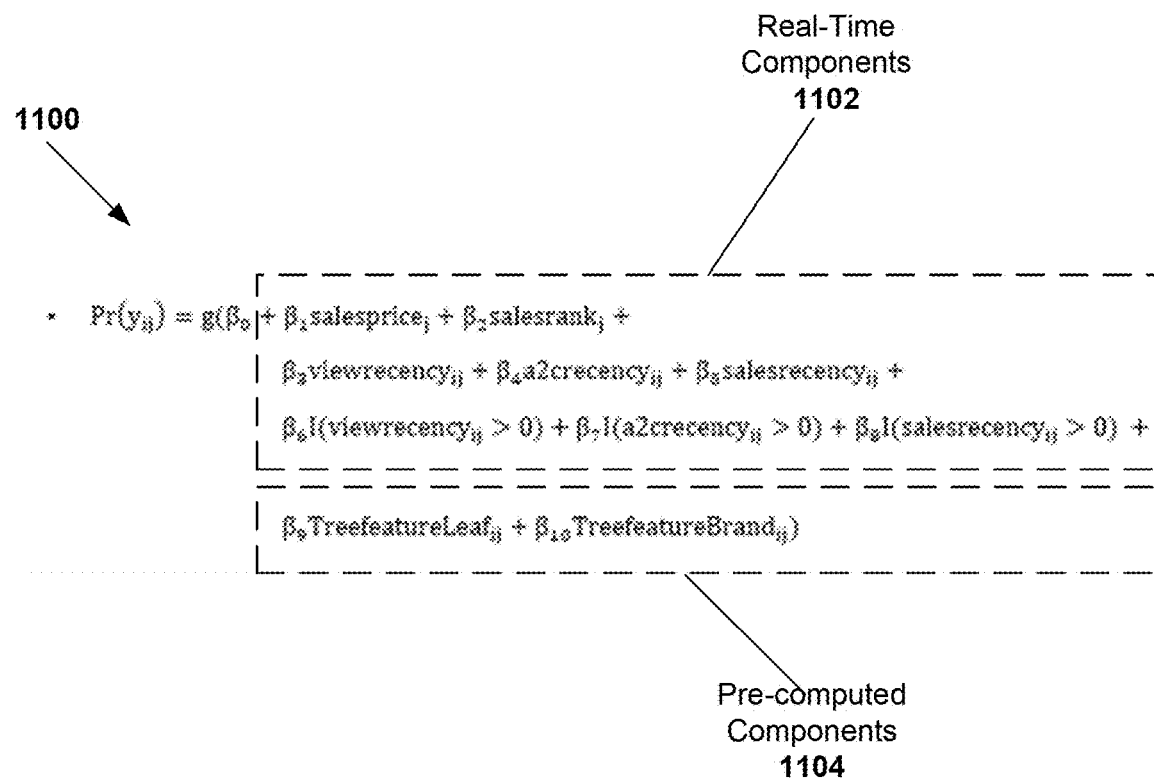
FIG. 11 illustrates another equation for a model used to predict personalized scores for items eligible for a promotion.

FIG. 11 illustrates another equation 1100 for a model used to predict personalized scores for items eligible for a promotion. The equation 1100 predicts a likelihood that a user "i" will make a purchase of an item "j". In some embodiments, each of the eligible items for an offer is scored and then ranked based the predicted probability the customer will purchase the item eligible for the promotion. The equation shown in FIG. 11 includes real-time components 1102 and pre-computed components 1104. The real-time components 1102 are similar to the real-time components 902 illustrated and described in reference to FIG. 9. In some embodiments, the pre-computed components 1104 are derived from the pre-computed components 904 illustrated and described in reference to FIG. 9. In some embodiments, the pre-computed components 1104 are determined for the customer users on a separate service which loads a database (e.g., by assigning scores in a look-table) with the pre-computed components for a plurality of customer users, wherein the personalized promotional items engine is able to access the pre-computed components for a particular customer user via a user ID. In some embodiments, using a separate service to determine pre-computed components for customer users improves the efficiency of the personalized promotional items engine, while allowing the personalized promotional items engine to also considering recent user activity with the real-time components 1102.

Figure 12:
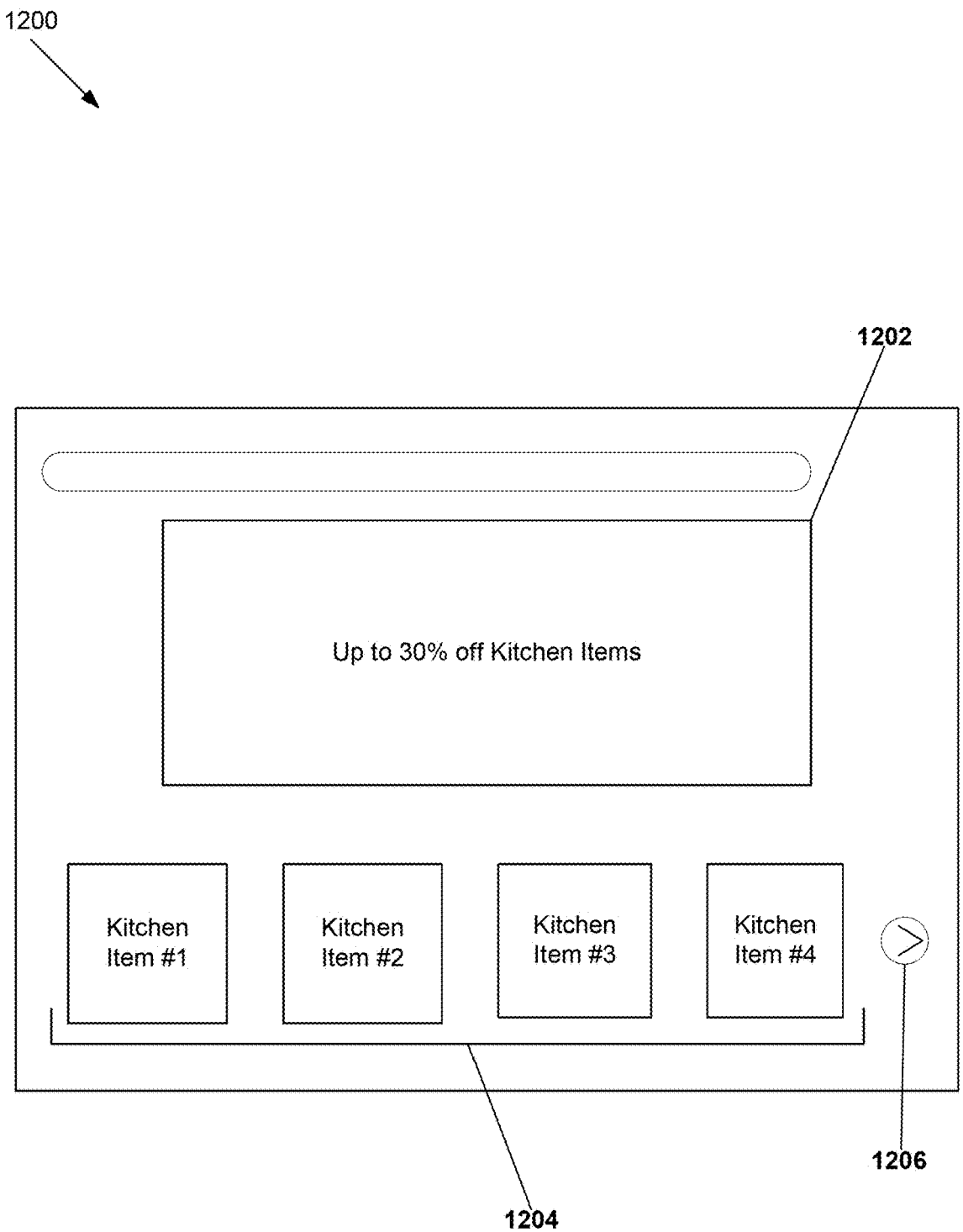
FIG. 12 illustrates an example user interface presenting a promotion on an e-commerce application for a retailer.

FIG. 12 illustrates an example user interface 118 presenting a promotion on an e-commerce application for a retailer. The user interface 118 includes an offer description 1202 with a list of items eligible for the promotion 1204. The offer description 1202 describes an offer. In some embodiments, the customer user selects an offer to open the user interface 118 and review the offer. In some embodiments, to determine which of a plurality of eligible items to display in the list of items eligible for the promotion includes to (1) retrieve the plurality of eligible items and interaction data associated with a customer user accessing the offer description page: and (2) ranking the items eligible for the promotion based as least in part on the interaction data, where the list of items eligible for the promotion initially includes a subset of highest ranked items of the plurality of eligible items.

In some embodiments, the user interface 118 presents a selected subset of items for display on a user device having limited display space which results in an improve user interface that requires fewer user clicks to arrive at a relevant item.

Figure 13:
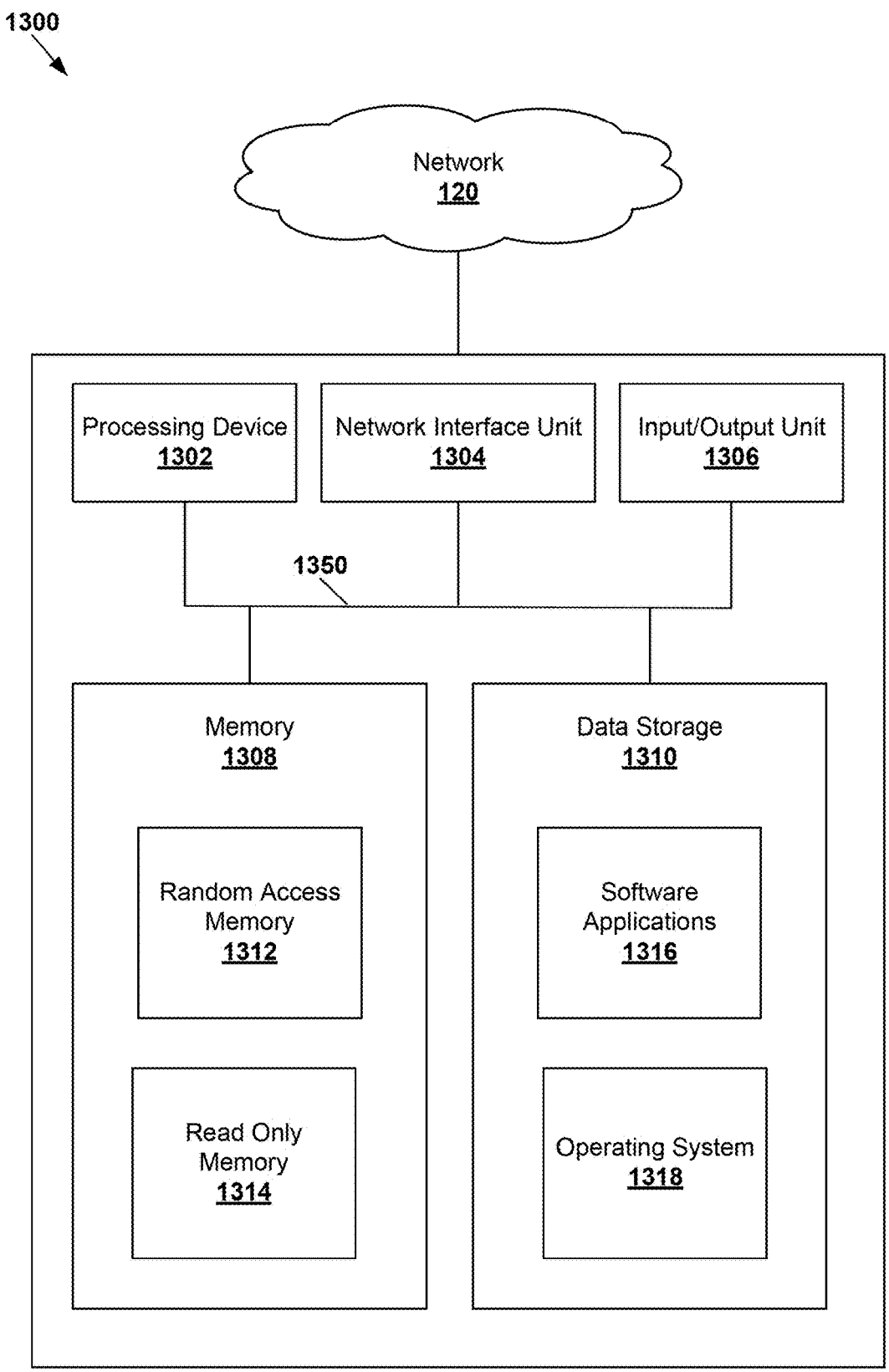
FIG. 13 a schematic diagram of an example computing device.

FIG. 13 illustrates a schematic diagram of an example computing device 1300. The example computing device 1300 is representative of the customer user computing device 116 illustrated and described in reference to FIG. 1. In some embodiments combinations of the components of the computing device 1300 are includes in the e-commerce system 102 illustrated and escribed in reference to FIG. 1, including duplicate components providing identical or similar functionality (e.g., to provide greater capacity, redundancy, or to provide services from multiple geographic locations). Alternatively, some components may be optimized to perform specialized functions and/or service (e.g., data storage service, machine learning services, etc.). Various combinations thereof are possible as well.

In the embodiment shown, the computing device 1300 includes a least one processing device 1302, a memory 1308, a system bus 1350, that couples the memory 1308 to the processing device 1302. The memory 1308 includes a random access memory ("RAM") 1312 and a read-only memory ("ROM") 1314. A basic input/output system that contains the basic routines that help to transfer information between elements within the computing device 1300, such as during startup, is stored in the ROM 1314. The computing device 1300 further includes data storage 1310. Data storage 1310 is able to store software instructions and data.

The data storage 1310 is connected to the processing device 1302 through a mass storage controller (not shown) connected to the system bus 1350. The data storage 1310 and its associated computer-readable storage media provide non-volatile, non-transitory data storage for the computing device 1300. Although the description of computer-readable storage media contained herein refers to a mass storage device, such as a hard disk or solid state disk, it should be appreciated by those skilled in the art that computer-readable data storage media can include any available tangible, physical device or article of manufacture from which the processing device 1302 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 1300.

According to various embodiments, the computing device 1300 can operate in a networked environment using logical connections to remote network devices through a network 120, such as a wireless network, the Internet, or another type of network. The computing device 1300 may connect to the network 120 through a network interface unit 1304 connected to the system bus 1350. It should be appreciated that the network interface unit 1304 may also be utilized to connect to other types of networks and remote computing systems. In some embodiments, the computing device 1300 also includes an input/output unit 1306 may provide output to a touch user interface display screen or other type of output device.

As mentioned above, the data storage 1310 and the RAM 1312 of the computing device 1300 can store software instructions and data. In some embodiments, the instructions include software applications 1316 and an operating system 1018 suitable for controlling the operation of the computing device 1300. The data storage 1310 and/or the RAM 1312 also store software instructions, that when executed by the processing device 1302, cause the computing device 1300 to provide the functionality discussed in this document.

Figure 14:
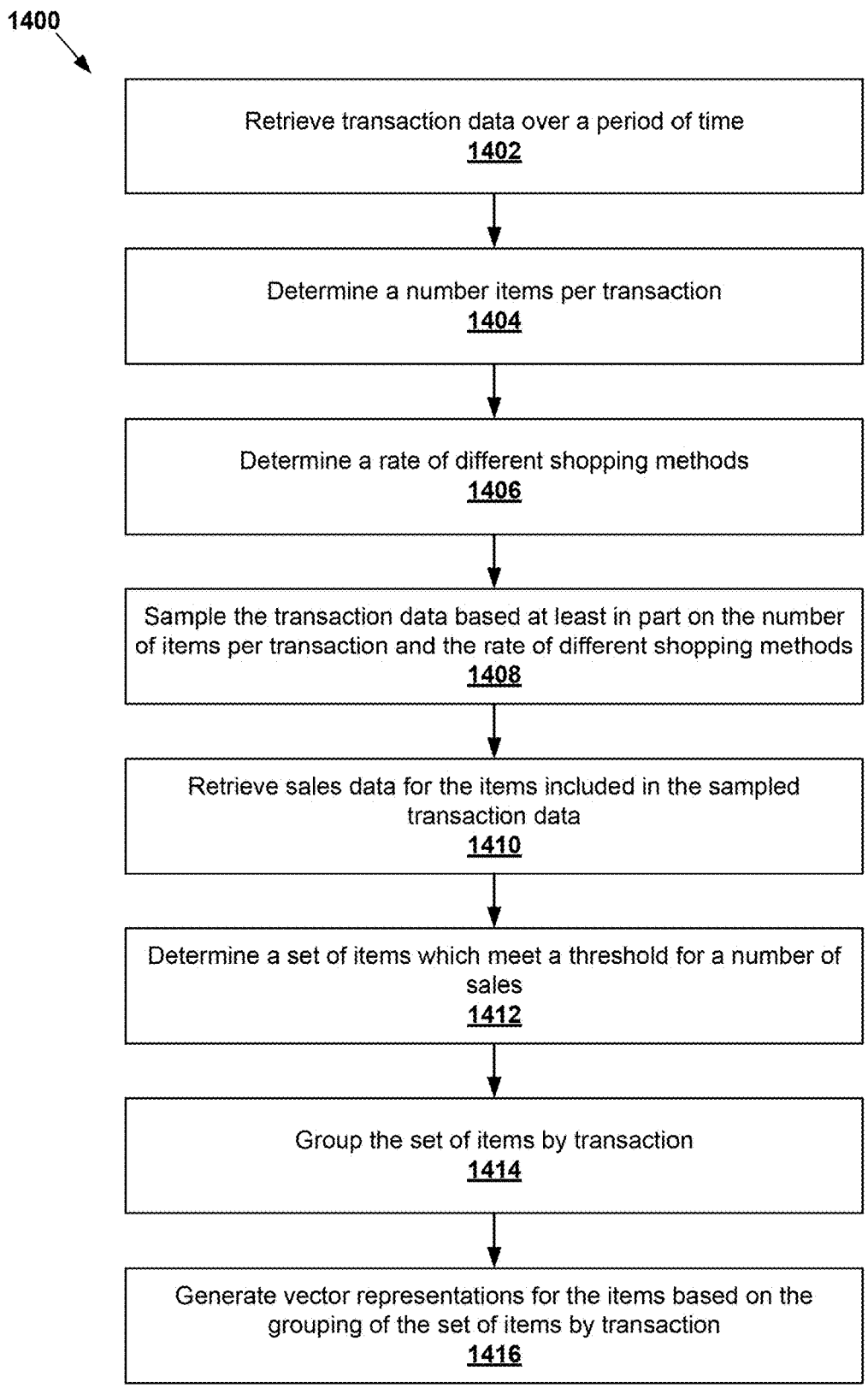
FIG. 14 illustrates an example method for generating a vector representation of item embeddings.

FIG. 14 illustrates an example method 1400 for generating a vector representation of item embeddings. In some embodiments, the method 1400 is performed as part of the method 300 illustrated and described in reference to FIG. 3. For example, to generate a vector representation of the item embeddings for items eligible for the promotion (e.g., at the operation 302) and/or to generate a vector representation of the item embeddings for items previously interacted with by the customer user (e.g., at the operation 304). The method 1400 includes the operation 1402, 1404, 1406, 1408, 1410, 1412, 1414, and 1416. Some embodiments, include various combinations of the operations 1402, 1404, 1406, 1408, 1410, 1412, 1414, and 1416. Similarly, in some embodiments one or more of these operations are optional.

The operation 1402 retrieves transaction data over a period of time. In some embodiments, the transaction data includes sales data from a predetermined period of time. For example, sales data over a previous week may be retrieved from a transaction data store. In some embodiments, transactions including returns are excluded.

The operation 1404 determines a number of items per transaction. The number of items per transaction is determined by processing the retrieved transaction data.

The operation 1406 determines a rate of different shopping methods. Examples of shopping methods include in store and online. The rate may indicate a proportion of items which were purchased online versus items which were purchased at a retail store.

The operation 1408 samples the transaction data based at least in part on the number of items per transactions and the rate of different shopping methods. The number of items per transaction and rate of different shopping method are used to determine a balanced sample dataset.

The operation 1410 retrieves sales data for the items included in the sampled transaction data. In some embodiments, the sales data includes items which were purchased in the sampled transaction data, price of items sold, and other transaction data.

The operation 1412 determines the set of items which meet a threshold. The set of items is determined based on the sales data retrieved at the operation 1410. In some embodiments, the operation 1412 is performed to reduce the size of the data set prior to generating the vector representations. In typical embodiments, the threshold is set for the number of purchases for an item over the predetermined period of time.

The operation 1414 groups the set of items by transaction. In some embodiments, the items are grouped by transaction ID to create a final data set, which is processed to generate the vector representations at the operation 1416. In some embodiments, the grouped items are structured as strings (e.g., comma delimited values) to allow for processing using a natural language processing context technology.

The operation 1416 generates vector representations for the items based on the grouping of the et of items by transaction. In some embodiments, a "word2vec" model is used to generate the vector representations.

In some embodiments, the method is performed periodically to update the item embeddings. For example, the item embeddings may be updated daily, weekly, monthly, etc.

As used herein, the term "engine" is applied to describe a specific structure for performing specific associated functions, such as a special purpose computer as programmed to perform algorithms (e.g., processes) disclosed herein. The engine can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Where data structures are referred to, the data structure can be stored on dedicated or shared computer readable mediums, such as volatile memory, non-volatile, transitory, or non-transitory memory.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method for dynamically presenting items eligible for a promotion on an e-commerce application of a retailer, the method comprising:
   receiving historical transaction data from a transaction dataset associated with a user;
   extracting item features from the transaction data;
   based on at least the extracted item features, training a machine learning model for generation of pre-computed components associated with the user;
   generating, at the trained machine learning model, pre-computed components associated with the user;
   receiving interaction data from an interaction data store and item data from an item data store;
   based on at least the interaction data and the item data, training the machine learning model for generation of real-time components;
   receiving, from a computing device associated with a customer user in a current online shopping session, a request for an offer description page of the promotion;
   retrieving items eligible for the promotion and interaction data associated with the current online shopping session;
   generating, at the trained machine learning model, real-time components associated with the user;
   based on both the generated pre-computed components and the generated real-time components, assigning a relevancy score for each of the items eligible for the promotion in real-time,
      wherein the pre-computed components predict a likelihood the customer user will purchase an item based at least in part on profile data of the customer user and on item features,
      wherein the real-time components predict a likelihood the customer user will purchase an item based at least in part on the interaction data collected in real-time;
   ranking the items eligible for the promotion based at least in part on the assigned relevancy scores; and
   generating a user interface for the offer description page presenting the items eligible for the promotion according to the ranking, wherein the offer description page initially displays a subset of the highest ranked items eligible for the promotion.

2. The method of claim 1, wherein ranking the items eligible for the promotion comprises:
   determining a similarity score for each of the items eligible for the promotion based on similarity between each of the items eligible for the promotion and items previously interacted with by the customer user, wherein the items previously interacted with by the customer user is determined from the interaction data; and
   ranking the items eligible for the promotion according to the similarity scores.

3. The method of claim 2, wherein determining the similarity scores comprises:
   generating item embeddings for each of the items eligible for the promotion and each of the items previously interacted with by the customer user; and
   calculating a pairwise cosine similarity between the item embeddings of the items eligible for the promotion with the item embeddings of the items previously interacted with by the customer user.

4. The method of claim 3, wherein a word2vec model is used to generate the item embeddings for each of the items eligible for the promotion and each of the items previously interacted with by the customer user.

5. The method of claim 3, wherein the item embeddings for the items previously interacted with by the customer user are weighted based on at least one of:
   (1) a recency of interaction;
   (2) a type of interaction; or
   (3) any combination of (1) and (2).

6. The method of claim 1, the method further comprising:
   updating the ranking of the items eligible for the promotion in real-time based on the customer user interacting with the e-commerce application.

7. The method of claim 1, wherein the profile data includes historical transaction data associated with the customer user.

8. The method of claim 1, wherein retrieving the items eligible for the promotion comprises retrieving a predetermined number of items based on item popularity.

9. The method of claim 1, wherein the highest ranked items eligible for the promotion are initially displayed as part of a list including at least one other item eligible for the promotion and the user interface includes a UI element to scroll the list.

10. The method of claim 1, wherein a number of items included in the subset of the highest ranked items eligible for the promotion is based at least in part on a screen size of the customer user computing device.

11. An e-commerce system comprising:
    at least one processor;
    at least one memory storing instructions, which when executed by the at least one processor cause the e-commerce system to:
       receive historical transaction data from a transaction dataset associated with a user;
       extract item features from the transaction data;
       based on at least the extracted item features, train a machine learning model for generation of pre-computed components associated with the user;
       generate, at the trained machine learning model, pre-computed components associated with the user;
       receive interaction data from an interaction data store and item data from an item data store;

based on at least the interaction data and the item data, train the machine learning model for generation of real-time components;

receive, from a computing device associated with a customer user in a current online shopping session, a request for an offer description page of the promotion;

retrieve items eligible for the promotion and interaction data associated with the customer user current online shopping session;

generate, at the trained machine learning model, real-time components associated with the user;

based on both the generated pre-computed components and the generated real-time components, assign a relevancy score for each of the items eligible for the promotion in real-time,
  wherein the pre-computed components predict a likelihood the customer user will purchase an item based at least in part on profile data of the customer user and on item features,
  wherein the real-time components predict a likelihood the customer user will purchase an item based at least in part on the interaction data collected in real-time;

rank the items eligible for the promotion based at least in part on the assigned relevancy scores interaction data; and generate a user interface for the offer description page presenting the items eligible for the promotion according to the ranking, wherein the offer description page initially displays a subset of the highest ranked items eligible for the promotion.

12. The e-commerce system of claim 11, wherein the instructions further cause the e-commerce system to:

determine a similarity score for each of the items eligible for the promotion based on similarity between each of the items eligible for the promotion and items previously interacted with by the customer user, wherein the items previously interacted with by the customer user is determined from the interaction data; and rank the items eligible for the promotion according to the similarity scores.

13. The e-commerce system of claim 11, wherein a number of items included in the subset of the highest ranked items eligible for the promotion is based at least in part on a screen size of the computing device.

14. A system comprising:

at least one processor;

at least one memory storing instructions, which when executed by the at least one processor cause the e-commerce system to:

generate a user interface comprising:

an offer description page with a list of items eligible for the promotion;

wherein to determine which of a plurality of eligible items to display in the list of items eligible for the promotion includes to:

receive historical transaction data from a transaction dataset associated with a user;

extract item features from the transaction data;

based on at least the extracted item features, train a machine learning model for generation of pre-computed components associated with the user;

generate, at the trained machine learning model, pre-computed components associated with the user;

receive interaction data from an interaction data store and item data from an item data store;

based on at least the interaction data and the item data, train the machine learning model for generation of real-time components;

receive, from a computing device associated with a customer user in a current online shopping session, a request for an offer description page of the promotion;

retrieve the plurality of eligible items and interaction data associated with the current online shopping session;

generate, at the trained machine learning model, real-time components associated with the user;

based on both the generated pre-computed components and the generated real-time components, assigning a relevancy score for each of the plurality of items eligible for the promotion in real-time,
  wherein the pre-computed components predict a likelihood the customer user will purchase an item based at least in part on profile data of the customer user and on item features,
  wherein the real-time components predict a likelihood the customer user will purchase an item based at least in part on the interaction data collected in real-time; and rank the plurality of items eligible for the promotion based at least in part on the assigned relevancy scores; and present the user interface at the computing device associated with the customer user, wherein the list of items eligible for the promotion initially includes a subset of highest ranked items of the plurality of eligible items.

15. The method of claim 1, wherein the interaction data store is updated in real-time as the user interacts with the current online shopping session.

* * * * *